(12) United States Patent  
Valenzuela et al.

(10) Patent No.: US 7,823,790 B1
(45) Date of Patent: Nov. 2, 2010

(54) INTEGRATED MEMORY CARD HOLDER WITH BACKCASE AND ROTATING DOOR

(75) Inventors: Tony Valenzuela, Everett, WA (US); Chris Kratle, San Jose, CA (US); Troy Hulick, Saratoga, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 11/476,242

(22) Filed: Jun. 27, 2006

Related U.S. Application Data

(63) Continuation of application No. 09/839,893, filed on Apr. 20, 2001, now Pat. No. 7,093,764.

(51) Int. Cl.
*G06K 7/00* (2006.01)

(52) U.S. Cl. ....................... 235/486; 235/487

(58) Field of Classification Search .................. 235/375, 235/486, 487, 492
See application file for complete search history.

(56) References Cited

U.S. PATENT DOCUMENTS

| | | | |
|---|---|---|---|
| 5,353,328 A | 10/1994 | Jokimies | |
| 5,436,969 A | 7/1995 | Kobayashi | |
| 5,603,629 A | 2/1997 | DeFrasne et al. | |
| 5,699,406 A | 12/1997 | Liikanen et al. | |
| 5,748,720 A | 5/1998 | Loder | |
| 5,790,659 A | 8/1998 | Strand | |
| 5,813,878 A | 9/1998 | Kuwata et al. | |
| 5,815,570 A | 9/1998 | Hannon et al. | |
| 5,883,786 A | 3/1999 | Nixon | |
| 5,894,597 A * | 4/1999 | Schwartz et al. | ............ 455/558 |
| 5,901,049 A | 5/1999 | Schmidt | |
| 5,933,328 A * | 8/1999 | Wallace et al. | ............ 361/737 |
| 5,969,331 A | 10/1999 | Hoolhorst | |
| 5,971,280 A | 10/1999 | Hoolhorst | |
| 5,975,584 A * | 11/1999 | Vogt | ............ 283/98 |
| 5,979,771 A | 11/1999 | Adams | |
| 5,984,707 A | 11/1999 | Kuwata | |
| 6,006,987 A | 12/1999 | Hoolhorst | |
| 6,018,669 A | 1/2000 | Stoegmueller | |
| 6,021,945 A | 2/2000 | Hoolhorst | |
| 6,047,070 A | 4/2000 | Raaf | |
| 6,050,492 A | 4/2000 | Hoolhorst | |

(Continued)

FOREIGN PATENT DOCUMENTS

DE     02842603     9/1978

(Continued)

*Primary Examiner*—Karl D. Frech

(57) ABSTRACT

An apparatus for holding a SIM (subscriber identification module) card for an electronic device. The electronic device is implemented using integrated circuits on a PCB (printed circuit board) contained within a device housing. A SIM connector mounted on the PCB may electrically connect a SIM card to the PCB. The SIM card is releasably held in position by a SIM card door. The SIM card door may engage the SIM card with the SIM connector when in a closed position. The SIM card door in open position may slidably accept the SIM card. The SIM card door is releasably engageable with the housing and is rotatably attached to the housing in order to swing to the closed position from the open position. Holding the SIM card with the SIM card door provides for a smaller SIM connector and thus a minimum amount of PCB area for mounting the SIM connector.

32 Claims, 3 Drawing Sheets

U.S. PATENT DOCUMENTS

| | | | |
|---|---|---|---|
| 6,106,317 A | 8/2000 | Michaelis et al. | |
| 6,174,188 B1 * | 1/2001 | Martucci | 439/326 |
| 6,175,505 B1 * | 1/2001 | Cheng et al. | 361/752 |
| 6,179,649 B1 | 1/2001 | An | |
| 6,193,557 B1 | 2/2001 | Luvini et al. | |
| 6,210,193 B1 | 4/2001 | Ito et al. | |
| 6,220,882 B1 | 4/2001 | Simmel et al. | |
| 6,226,189 B1 * | 5/2001 | Haffenden et al. | 361/814 |
| 6,234,810 B1 | 5/2001 | Schnell et al. | |
| 6,424,118 B1 | 7/2002 | Tu | |
| 6,450,408 B2 * | 9/2002 | Shiue | 235/492 |
| 6,468,101 B2 * | 10/2002 | Suzuki | 439/326 |
| 6,547,138 B1 * | 4/2003 | Braun et al. | 235/441 |
| 6,724,618 B1 | 4/2004 | Jenkins et al. | |

FOREIGN PATENT DOCUMENTS

| | | |
|---|---|---|
| DE | 4008655 | 8/1991 |
| DE | 04419073 | 5/1994 |
| DE | 19611237 | 3/1996 |
| DE | 19703007 | 1/1997 |
| EP | 0475210 | 8/1991 |
| EP | 0503434 | 3/1992 |
| EP | 0564105 | 6/1993 |
| EP | 0989683 | 9/1999 |
| EP | 0967771 | 12/1999 |
| EP | 1004979 | 5/2000 |
| GB | 1984436 | 2/1968 |
| GB | 02327791 | 2/1999 |
| GB | 02327792 | 2/1999 |
| GB | 02338811 | 12/1999 |
| JP | 08329203 | 12/1996 |
| JP | 2002/101170 | 4/2002 |
| WO | 99/44378 | 1/1999 |
| WO | 99/64976 | 12/1999 |

* cited by examiner

100

INTEGRATED MEMORY CARD HOLDER WITH BACKCASE AND ROTATING DOOR

RELATED U.S. PATENT APPLICATION

This Continuation Application claims the benefit of the co-pending, commonly-owned U.S. patent application Ser. No. 09/839,893, filed on Apr. 20, 2001, now U.S. Pat. No. 7,093,764 by Valenzuela et al., and titled "An Integrated SIM Holder With Backcase And Rotating Door," which is incorporated herein by reference.

TECHNICAL FIELD

The present invention relates to a system and method by which computing devices may more easily utilize SIM (subscriber identification module) card mechanisms. In particular, the present invention relates to a system and method for implementing a secure SIM card confinement mechanism with minimal mounting area and convenient access.

BACKGROUND ART

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Device (PD) applications such as an address book, a daily organizer, and electronic notepads.

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PahnPilot Personal, PalmPilot Professional, Palm, and Palm III, Palm V, Palm WI, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, expense reports, to do lists, or games. PIDs also often include substantial electronic memory for storing such applications as well as data entered by the user. Due to their substantial variety of applications and uses, personal information devices are becoming increasingly widely used.

The use of subscriber identification module (SIM) cards in portable hand-held devices, such as PIDs or cellular phones, is a requirement for any GSM enabled device. In a GSM cellular phone, the SIM card is typically used for billing and security. The SIM card may also be used for storing operational data such as a phone book, small programs, and/or quick dial numbers. With a SIM card, a user can operate various phones and still retain, for example, a single billable account. As PIDs incorporate GSM radio capabilities, they will assume the roles and applications of cellular telephones. These same capabilities (e.g., phone book, billing information, etc.) are provided by incorporating SIM cards into the PIDs. The SIM card thus eliminates the need to reprogram information (e.g., phone numbers, addresses, etc.) and enables a single billable customer account for multiple SIM card enabled devices.

In prior art mechanisms, the SIM card is typically mounted in the housing of the hand-held device and secured with a latching assembly. Various latching assemblies are known, however, they typically contain two or more distinct components. When the SIM card is located in a cosmetic region of the phone, a door is typically used to access the SIM card. A separate latching mechanism is integrated into the SIM connector to securely hold the SIM card. In this arrangement, the user must open the door and then unlatch the card by sliding a locking mechanism and/or rotating the lock to gain access to the SIM card. This manipulation can be very difficult due to the small parts and intricate areas involved. These integrated SIM latching connectors also require excessive amounts of PCB (printed circuit board) space, which also makes them a less attractive solution.

Other prior art mechanisms implement a SIM connector snapped into the rear housing of a hand-held device, or fixed directly to the device's printed circuit board (PCB) with a SIM card door for preventing the SIM card from falling out of the device. For example, when the door is open, the SIM card can be removed by simply turning the phone upside-down and allowing the SIM card to fall out. In this arrangement, a confining apparatus must be included to properly confine the SIM card in place. This confining "well" adds size and area to the SIM connector (e.g., consuming excessive amounts of PCB area), and allows the SIM card to simply fall out if the hand-held device is inadvertently turned upside-down with the door open.

Thus, what is required is a solution that eliminates the requirement for a separate latching mechanism integrated into a SIM connector. The required solution should facilitate easy operation by a user. The required solution should require a minimum amount of PCB (printed circuit board) area for mounting a SIM connector. The required solution should securely hold a SIM card when in an open position to prevent inadvertently losing the SIM card. The required solution should be intuitive and compatible with typical hand-held device cases with which users have become familiar. The present invention provides a novel solution to the above requirements.

SUMMARY OF THE INVENTION

The present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar.

In one embodiment, the present invention is implemented as an integrated back case and rotating door SIM card holder apparatus. The apparatus functions by holding a SIM (subscriber identification module) card for the electronic device. The electronic device is implemented using integrated circuits on a PCB (printed circuit board) contained within a device housing. A SIM connector is mounted on the PCB and is configured to electrically connect the SIM card to the PCB when the SIM card is engaged with the SIM connector. The SIM card is releasably held in position by a SIM card door. The SIM card door is configured to move the SIM card into engagement with the SIM connector when in a closed position. The SIM card door can be configured to slidably accept the SIM card into a properly aligned position when the SIM card door is in the open position. The SIM card door also includes features that force the user to orient the SIM card properly in the SIM card door to ensure proper engagement with the SIM connector when closed. The SIM card door is releasably engageable with the back case of the housing and is rotatably attached to the back case such that the SIM card door swings into the closed position from the open position.

Holding the SIM card with the SIM card door provides for a smaller SIM connector and thus a minimum amount of PCB area for mounting the SIM connector. Additionally, the SIM card door securely holds a SIM card when in an open position to prevent inadvertently loosing the SIM card. Manipulation (e.g., inserting, removing) of the SIM card and opening and closing of the SIM card door is intuitive to the user.

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

The present invention comprises an integrated back case and rotating door SIM card holder apparatus. The apparatus of the present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar. The present invention and its benefits are further described below.

Figure 1:
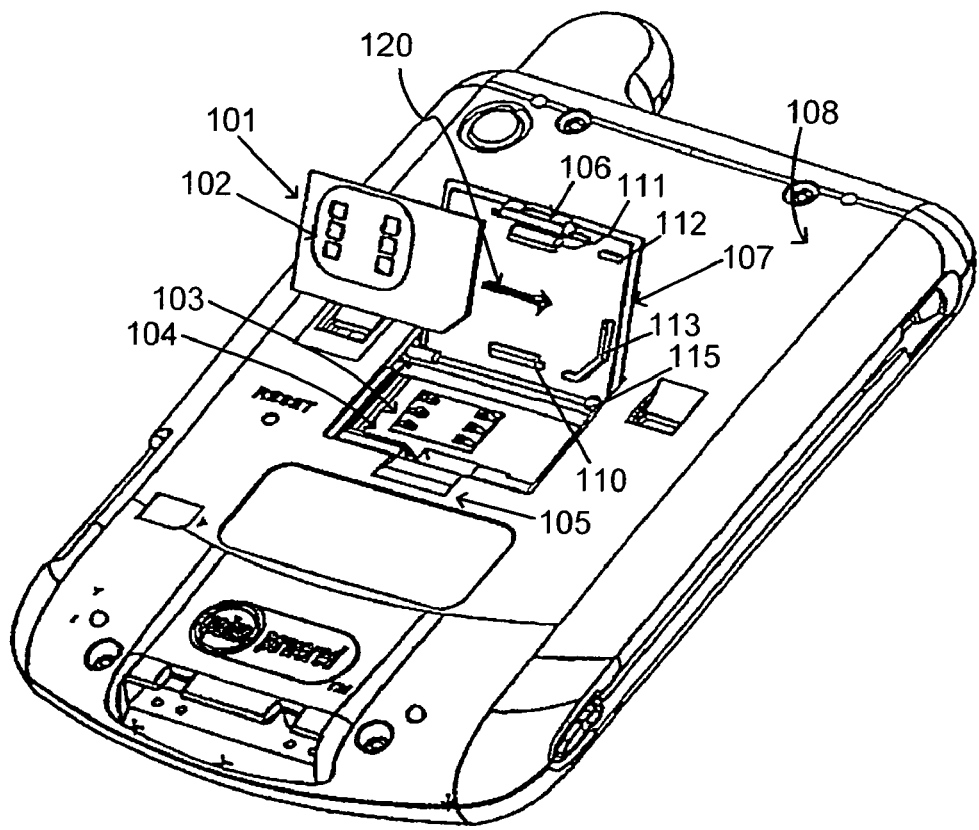
FIG. 1 shows a diagram of a back case of a housing of a personal information device including a SIM card door apparatus in accordance with one embodiment of the present invention.

FIG. 1 shows a diagram of the back case 108 of a PID (personal information device) 100 in accordance with one embodiment of the present invention. The present invention comprises a back case 108 having an integrated rotating door SIM card holder apparatus, SIM card door 107. Although the present invention is described in the context of a PID, it should be noted that embodiments of the present invention are suited for use in other types of hand-held electronic devices (cellular telephones, pagers, etc.).

As depicted in FIG. 1, PID 100 is enclosed a case housing, of which back case 108 (e.g., the back of PID 100) is shown. As depicted in FIG. 1, SIM card door 107 is in an open position. SIM card door 107 is configured to accept SIM card 101, as SIM card 101 is slid into position from left to right as indicated by arrow 120. SIM card door 107 is configured to hold the SIM card 101 in the proper position using the integral holders 110, 111, 112, and 113. Holders 110-113 thus releasably confine and hold SIM card 101 in the proper position.

Once the SIM card 101 is slid into position (e.g., slid from left to right into holders 110-113), the SIM card door 107 can be rotated into the closed position, where the electrical contacts 102 of SIM card 101 are brought into electrical contact with a SIM connector 103. SIM connector 103 functions by communicatively coupling electrical contacts 102 of the SIM card 101 with other integrated circuit devices of a PCB (printed circuit board) 104. SIM card door 107 rotates/swings between the open position and the closed position about a pivot 115. SIM card door 107 uses a latch 106 and a latch receiver 105 to securely latch into the closed position, such that SIM card door 107 is releasably engageable with back case 108. By latching into the closed position, SIM card door 107 moves SIM card 101 (e.g., contacts 102) into electrical connection with the SIM card connector 103. The latch 106 is integral with the SIM card door 107.

Referring still to FIG. 1, it should be noted that holding the SIM card 101 with the SIM card door 107 provides for a smaller SIM connector 103 in comparison to the prior art. In accordance with the present invention, SIM connector 103 is only required to electrically connect the electrical contacts 102 of SIM card 101 with PCB 104. The task of confining and holding SIM card 101 in the proper position is performed by SIM card door 107. SIM connector 103 need only establish a reliable electrical connection. Thus, SIM connector 103 can be optimized to use a minimum amount of PCB area. For example, as depicted in FIG. 1, SIM connector 103 is much smaller the SIM card 101, and thus requires a very small mounting area on PCB 104. The very small mounting area reduces costs associated with fabricating SIM connector 103, and more importantly, conserves valuable surface area of the PCB 104 itself.

Additionally, it should be noted that the SIM card door 107 securely holds SIM card 101 when in both the open position and in the closed position. Thus, SIM card door 107 prevents inadvertently loosing the SIM card 101 when SIM card door 107 is open. Manipulation (e.g., inserting, removing) of the SIM card 101 and opening and closing of the SIM card door 107 requires a positive action by the user (e.g., SIM card 101 will not fall out if the electronic device 100 is turned over). The operation of SIM card door 107 is intuitive to the user. Also, SIM card door 107 facilitates easy operation by a user and is compatible with typical hand-held device cases and housings with which users have become familiar.

Figure 2:
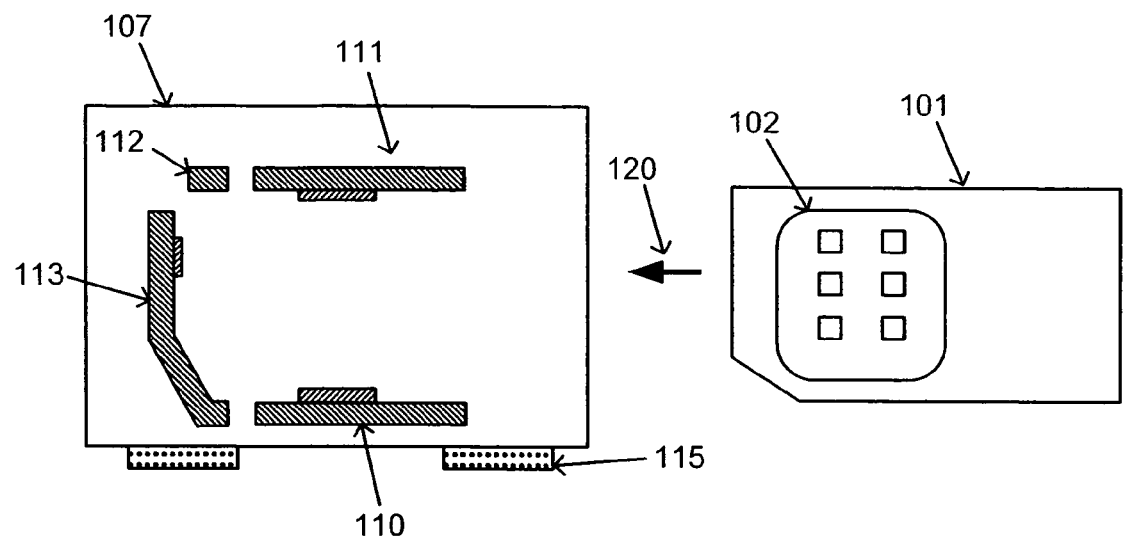
FIG. 2 shows a close-up view of a SIM card door and a SIM card prior to the SIM card being inserted into the proper position.

FIG. 2 shows a close-up view of SIM card door 107 and SIM card 101. As described above, SIM card door 107 includes holders 110-113 which receive SIM card 101 as it is slid into place by the user, as indicated by arrow 120. FIG. 2 shows SIM card door 107 prior to receiving SIM card 101.

Figure 3:
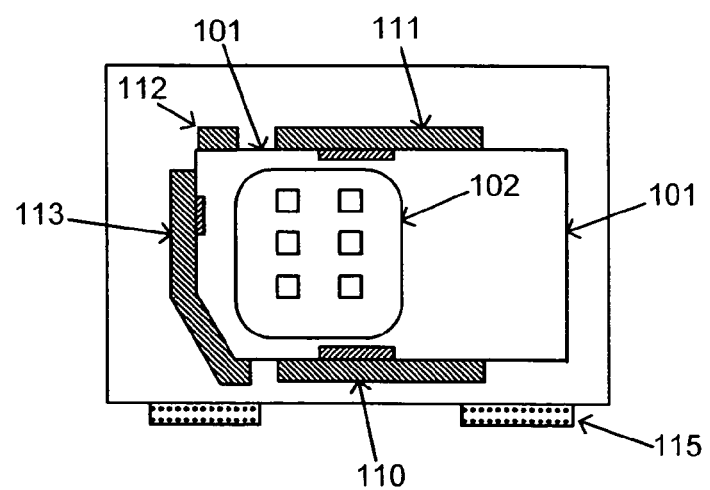
FIG. 3 shows a close-up view of a SIM card door and a SIM card after the SIM card has been inserted into the proper position.

FIG. 3 shows a close-up view of SIM card door 107 and SIM card 101 after SIM card 101 has been slid into position. As described above, once in position, SIM card 101 is held in place by holders 110-113. Holders 110-113 are configured such that the electrical contacts 102 of SIM card 101 are in proper alignment, such that when SIM card door 107 is rotated into the closed position, contacts 102 will properly connect with SIM connector 103 (shown in FIG. 1).

Figure 4:
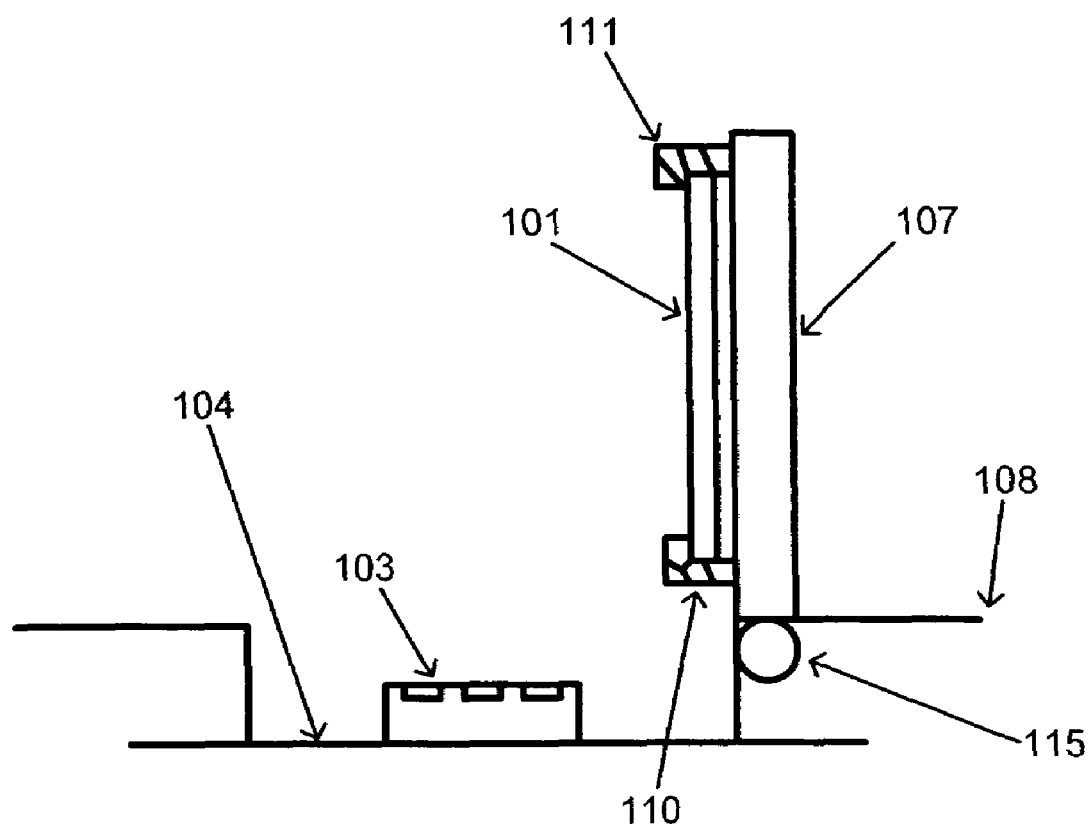
FIG. 4 shows a side close-up view of a SIM card door and a SIM card prior to the SIM card door being rotated into the post position.

FIG. 4 shows a close-up side view of SIM card door 107 and SIM card 101 after SIM card 101 has been slid into position. As depicted in FIG. 4, SIM card door 107 is in the open position. As described above, the task of confining and holding SIM card 101 in the proper position is performed by SIM card door 107. Thus, SIM connector 103 can be optimized to use a minimum amount of area of PCB 104. To close SIM card door 107, the user rotates SIM card door 107 about pivot 115, such that SIM card door 107 swings into the closed position and latches.

Thus, the present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A system for connecting a memory card to an outer housing of a computer system, said system comprising:
   a printed circuit board disposed adjacent to a back housing of said computer system;
   a memory card connector mounted on said printed circuit board, said memory card connector configured to electrically connect said memory card to said printed circuit board, wherein said memory card connector comprises a plurality of contacts that is smaller in area than an area of said memory card; and
   a memory card fastener for aligning said memory card to said memory card connector and for removeably engaging said memory card with said memory card connector, and wherein said memory card fastener is on said outer housing of said system that is operable to receive said memory card without displacement of an electronic component, and wherein said memory card fastener comprises a plurality of discrete holders for releasably holding said memory card from at least three sides.

2. The system of claim 1, wherein said memory card fastener is a door coupled to said back housing.

3. The system of claim 2, wherein said door is configured to slidably accept said memory card into a properly aligned position when said door is in said open position.

4. The system of claim 1 further comprising said memory card.

5. The system of claim 1 wherein said computer system is a mobile computer system comprising:
   a display screen;
   a processor; and
   a user input device.

6. The system of claim 1 wherein said memory card fastener comprises physical components for securing and aligning said memory card when slid therein.

7. The system of claim 1 wherein said memory card fastener is operable to accommodate only said memory card.

8. The system of claim 1, wherein said memory card is a SIM (subscriber identification module).

9. The system of claim 1, wherein said electronic component is a battery.

10. The system of claim 1, wherein said memory card fastener securely holds said memory card, independent from an orientation of said system, when said memory card fastener is in open position.

11. The system of claim 1, wherein said plurality of discrete holders utilize at least one latch.

12. The system of claim 11, wherein said at least one latch is integrated within said memory card fastener.

13. An electronic device operable to interface with a removable memory card on an outer housing of said electronic device, said electronic device comprising:
   a housing comprising a back side, said housing for containing electronic devices;
   a printed circuit board disposed adjacent to a said back side of said housing;
   a memory card connector mounted on said printed circuit board, said memory card connector configured to electrically connect said memory card to said printed circuit board, wherein said memory card connector comprises a plurality of contacts that is smaller in area than said area of said memory card; and
   a memory card fastener for aligning said memory card to said memory card connector and for removeably engaging said memory card with said memory card connector, and wherein said memory card fastener is on said outer housing of said electronic device that is operable to receive said memory card without displacement of an electronic component, and wherein said memory card fastener comprises a plurality of discrete holders for releasably holding said memory card from at least three sides.

14. The electronic device of claim 13, wherein said memory card fastener is a door.

15. The electronic device of claim 14, wherein said door is configured to slideably accept said memory card into a properly aligned position when said door is in said open position.

16. The electronic device of claim 13 further comprising said memory card.

17. The electronic device of claim 13 wherein said electronic device is a mobile computer system comprising:
   a display screen;
   a processor; and
   a user input device.

18. The electronic device of claim 13 wherein said electronic device is a cellular telephone.

19. The computer system of claim 13 wherein said memory card fastener comprises physical components for securing and aligning said memory card when slid therein.

20. The computer system of claim 13 wherein said memory card fastener is operable to accommodate only said memory card.

21. The electronic device of claim 13, wherein said memory card is a SIM (subscriber identification module).

22. The electronic device of claim 13, wherein said electronic component is a battery.

23. A system for connecting a memory card to an outer housing of an electronic device, said system comprising:

a printed circuit board disposed adjacent to a back housing of said electronic device;

a memory card connector mounted on said printed circuit board, said memory card connector configured to electrically connect said memory card to said printed circuit board, wherein said memory card connector comprises a plurality of contacts that is smaller in area than an area of said memory card; and a memory card fastener for aligning said memory card to said memory card connector and for removeably engaging said memory card with said memory card connector, and wherein said memory card fastener is on said outer housing of said system that is operable to receive said memory card without displacement of an electronic component, and wherein said memory card fastener comprises a plurality of discrete holders for releasably holding said memory card from at least three sides.

24. The system of claim 23, wherein said memory card fastener is a door.

25. The system of claim 24, wherein said door is configured to slideably accept said memory card into a properly aligned position when said door is in said open position.

26. The system of claim 23 further comprising said memory card.

27. The system of claim 23 wherein said electronic device is a mobile computer system comprising:

a display screen;

a processor; and a user input device.

28. The system of claim 23 wherein said electronic device is a cellular phone.

29. The system of claim 23 wherein said memory card fastener comprises physical components for securing and aligning said memory card when slid therein.

30. The system of claim 23 wherein said memory card fastener is operable to accommodate only said memory card.

31. The system of claim 23, wherein said memory card is a SIM (subscriber identification module).

32. The system of claim 23, wherein said electronic component is a battery.

* * * * *